(12) United States Patent
Razak et al.

(10) Patent No.: US 11,303,181 B2
(45) Date of Patent: Apr. 12, 2022

(54) PREVENTING ELECTRICAL BREAKDOWN

(71) Applicant: ROLLS-ROYCE plc, London (GB)

(72) Inventors: Ahmed My Razak, Bristol (GB); Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 487 days.

(21) Appl. No.: 15/984,544

(22) Filed: May 21, 2018

(65) Prior Publication Data

US 2018/0342921 A1   Nov. 29, 2018

(30) Foreign Application Priority Data

May 24, 2017  (GB) ..................... 1708289

(51) Int. Cl.
| | | |
|---|---|---|
| *H02K 5/124* | (2006.01) | |
| *H02K 5/12* | (2006.01) | |
| *B64D 13/02* | (2006.01) | |
| *B64D 27/10* | (2006.01) | |
| *B64D 27/24* | (2006.01) | |
| *B64D 27/02* | (2006.01) | |
| *F01D 15/08* | (2006.01) | |
| *B64D 13/06* | (2006.01) | |
| *F02C 3/04* | (2006.01) | |

(52) U.S. Cl.
CPC ............ *H02K 5/124* (2013.01); *B64D 13/02* (2013.01); *B64D 27/10* (2013.01); *B64D 27/24* (2013.01); *F02C 3/04* (2013.01); *H02K 5/12* (2013.01); *B64D 13/06* (2013.01); *B64D 2027/026* (2013.01); *F01D 15/08* (2013.01); *H02K 2205/09* (2013.01)

(58) Field of Classification Search
CPC .... H02K 5/124; H02K 2205/09; B64D 27/10; F04D 27/00; F04D 27/001; F04D 27/004; F04B 37/10; F04B 37/12
USPC .......................................................... 310/89
See application file for complete search history.

(56) References Cited

U.S. PATENT DOCUMENTS

| | | | |
|---|---|---|---|
| 3,681,628 A | 8/1972 | Krastchew | |
| 4,662,826 A | 5/1987 | Nitta et al. | |
| 5,977,645 A * | 11/1999 | Glennon ................. | H02J 4/00 290/40 F |
| 8,810,098 B2 * | 8/2014 | Bright ................. | H02K 19/106 310/103 |

(Continued)

FOREIGN PATENT DOCUMENTS

| | | |
|---|---|---|
| CN | 103459853 A | 12/2013 |
| EP | 2 631 489 A1 | 8/2013 |

(Continued)

OTHER PUBLICATIONS

Great Britain Search Report dated Nov. 23, 2017, issued in GB Patent Application No. 1708289.2.

(Continued)

*Primary Examiner* — Philip E Stimpert
(74) *Attorney, Agent, or Firm* — Oliff PLC

(57) ABSTRACT

An electric machine (101) for use in an aircraft is shown. The electric machine comprises a casing (104) containing electromechanical components, a shaft (106) which extends outside of the casing, a seal (107) to seal the casing around the shaft, and a pressurisation system (102) configured to pressurise the casing above an external pressure to prevent electrical breakdown within gas in the casing.

11 Claims, 6 Drawing Sheets

(56) References Cited

U.S. PATENT DOCUMENTS

| | | | |
|---|---|---|---|
| 9,083,207 B1 | 7/2015 | Veltri et al. | |
| 9,759,083 B2 * | 9/2017 | Sgambati | F03B 13/00 |
| 2003/0152459 A1 | 8/2003 | Gliebe | |
| 2007/0031078 A1 | 2/2007 | Hackett | |
| 2010/0083669 A1 * | 4/2010 | Foster | F02C 7/36 60/802 |
| 2010/0139776 A1 * | 6/2010 | Auber | F04D 29/083 137/13 |
| 2010/0181861 A1 * | 7/2010 | Takamatsu | B60K 6/26 310/196 |
| 2010/0294374 A1 | 11/2010 | Sears et al. | |
| 2012/0227389 A1 | 9/2012 | Hinderks | |
| 2013/0126669 A1 | 5/2013 | Hamann et al. | |
| 2013/0170961 A1 * | 7/2013 | Meucci | F01D 25/22 415/170.1 |
| 2015/0318760 A1 | 11/2015 | Veltri et al. | |
| 2016/0355272 A1 | 12/2016 | Moxon | |
| 2018/0127103 A1 | 5/2018 | Cantemir | |

FOREIGN PATENT DOCUMENTS

| | | | |
|---|---|---|---|
| GB | 583798 | | 6/1943 |
| GB | 583798 A | * 12/1946 | F02B 75/222 |
| GB | 718200 | | 11/1954 |
| JP | 2005-209791 A | | 8/2005 |
| JP | 2016-75285 A | | 5/2016 |

OTHER PUBLICATIONS

Great Britain Search Report dated Nov. 23, 2017, issued in GB Patent Application No. 1708297.5.
Jul. 25, 2019 Office Action issued in European Patent Application No. 18 170 239.0.
https://theflyingengineer.com/flightdeck/pw1100g-gtf/, retreieved Feb. 3, 2020 (Year: 2014).
Feb. 6, 2020 Office Action issued in U.S. Appl. No. 15/984,557.
U.S. Appl. No. 15/984,557, filed May 21, 2018 in the name of Razak, A.
U.S. Appl. No. 15/984,555, filed May 21, 2018 in the name of Razak, A.
U.S. Appl. No. 15/984,552, filed May 21, 2018 in the name of Razak, A.
Jul. 9, 2020 Office Action issued in U.S. Appl. No. 15/984,557.
Jul. 10, 2020 Office Action issued U.S. Appl. No. 15/984,555.
Apr. 2, 2020 Office Action Issued in U.S. Appl. No. 15/984,555.
Apr. 2, 2020 Office Action issued in U.S. Appl. No. 15/984,552.
Dec. 23, 2020 Office Action issued in U.S. Appl. No. 15/984,555.
Dec. 23, 2020 Office Action issued in U.S. Appl. No. 15/984,557.
Oct. 29, 2020 Office Action issued in European Patent Application No. 18 170 236.6.
Apr. 21, 2021 Office Action issued in U.S. Appl. No. 15/984,555.
Apr. 21, 2021 Office Action issued in U.S. Appl. No. 15/984,557.
Sep. 15, 2021 Office Action issued in U.S. Appl. No. 15/984,555.
Sep. 15, 2021 Office Action issued in U.S. Appl. No. 15/984,557.
Nov. 8, 2021 Office Action issued in European Patent Application No. 18 170 236.6.
Sep. 28, 2021 Office Action issued in Chinese Patent Application No. 201810507924.9.
Jan. 20, 2022 Office Action issued in U.S. Appl. No. 15/984,557.
Jan. 20, 2022 Office Action issued in U.S. Appl. No. 15/984,555.

* cited by examiner

PREVENTING ELECTRICAL BREAKDOWN

CROSS-REFERENCE TO RELATED APPLICATION

This application is based upon, and claims the benefit of priority from UK Patent Application No. 1708289.2, filed on 24 May 2017, the entire contents of which are hereby incorporated by reference.

TECHNICAL FIELD

This disclosure relates to the prevention of electrical arcing in electric machines in gaseous environments in which electrical breakdown may occur.

BACKGROUND

At sea level, the dielectric strength of air is typically in the region of megavolts. However, in regions of low air pressure, such as experienced by aircraft at cruise altitude, the dielectric strength may drop to the order of only hundreds of volts.

Electric machines (a term which will be appreciated encompasses electric motors, electric generators and other electromagnetic machines and combinations thereof) are typically subjected to voltage derating as altitude increases to prevent the likelihood of electrical breakdown and the attendant phenomena such as arcing and corona, which may cause catastrophic failure modes.

Current thought suggests that electric machines will play an increasingly important role in efforts to reduce fuel consumption of aircraft, possibly by being embedded in hybrid gas turbine engines or by forming part of a distributed propulsion system. Due to the thrust demand placed upon the propulsion system and the necessarily high voltage requirement of the electric machines in such applications, it may not be possible to circumvent the issue by simply moving to a voltage regime which will not exceed the breakdown voltage.

Other measures to mitigate the risk of electrical breakdown in electric machines are therefore required.

SUMMARY

The present disclosure is directed towards an electric machine for use in an aircraft, and an aircraft comprising the same.

The electric machine comprises a casing containing electromechanical components, a shaft which extends outside of the casing, a dry gas seal to seal the casing around the shaft, and a pressurisation system configured to pressurise the casing above an external gas pressure to prevent electrical breakdown within the gas the casing, wherein an inlet of the dry gas seal is connected with the pressurisation system to receive pressurised gas therefrom.

In this way, the components liable to be damaged by electrical breakdown phenomena such as arcing and corona are sealed in a casing pressurised by the pressurisation system, and work may be performed by the electric machine upon external systems via its shaft.

The electric machine may be configured as an electric motor or an electric generator, and may operate using alternating or direct current.

When installed in an aircraft, the pressurisation system will operate to raise the pressure inside the casing of the electric machine above the external gas pressure. Given typical cruise altitudes, the external gas pressure will be low and thus the breakdown voltage will also be low. This may lead to electrical breakdown events. An increase in the gas pressure within the casing, however, results in a smaller mean free path between molecules within the gas within the casing, thereby increasing the likelihood of collisions. Due to the greater number of collisions, free electrons are not able to accelerate to the same degree in the electric field, and therefore do not acquire as much energy prior to a collision. This therefore increases the voltage required for electron avalanche initiation to a point greater than the peak operational voltage within the casing, thereby preventing electrical breakdown.

In an embodiment, the electric machine may form part of an engine on the aircraft.

The pressurisation system may receive input gas from a bleed air system of the aircraft. In such an example, the pressurisation system may form part of a broader engine control strategy for increasing the surge margin of the aircraft's engines by controlling the degree of take-off air from the compressor stages. Alternatively, or in addition, the pressurisation system may receive input gas from a cabin air exhaust of the aircraft. A degree of cabin air is typically vented directly to atmosphere and thus its use as the input for the pressurisation system may reduce any parasitic losses of the system.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
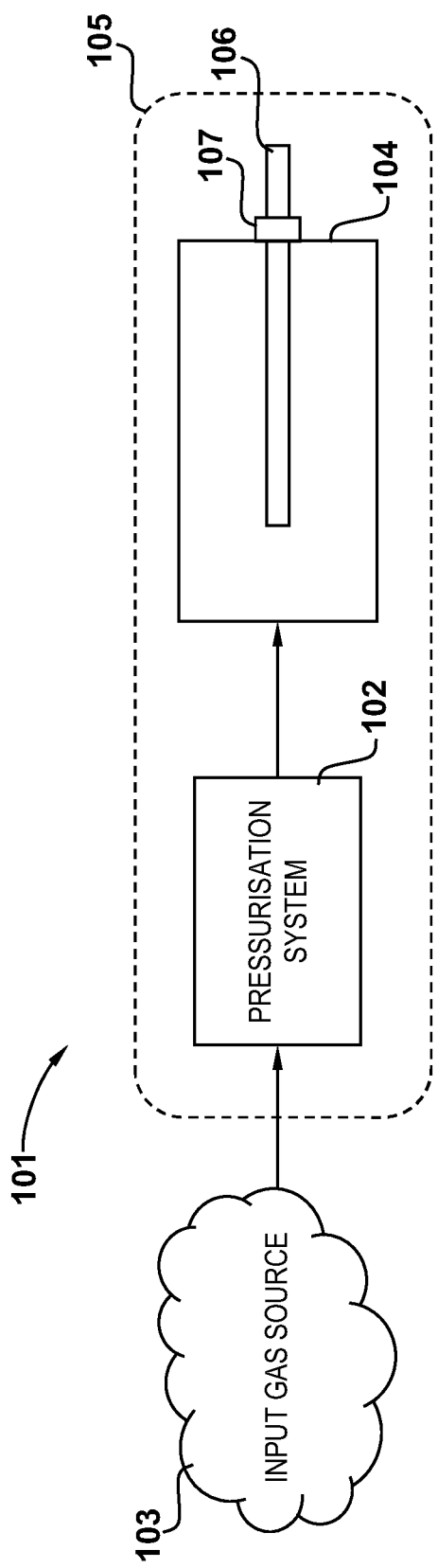
FIG. 1 shows a block diagram of an electric machine according to the present disclosure.

A block diagram illustrating an embodiment is shown in FIG. 1, in which an electric machine is shown generally at 101. The electric machine 101 comprises a pressurisation system 102 which receives a supply of input gas from an input gas source 103. The input gas source 103 could be the atmosphere, or, as described previously, could be a source of pre-pressurised gas such as a bleed air system or a cabin air exhaust of an aircraft.

The pressurisation system 102 operates to pressurise a casing 104 of the electric machine 101 above an external pressure of the environment 105 in which the electric machine 101 is located.

The casing 104 houses electromechanical components (not shown) which effect the conversion of electrical power into work upon a shaft 106, or vice versa depending upon the assigned role of the electric machine 101, for example whether it is to operate as a motor or generator. It will be appreciated that the exact configuration of the electromechanical components within the casing 104 will differ according to the type of the electric machine as implemented, and thus may include coils, magnets, brushes, springs, commutators, power electronics, etc.

As the shaft extends outside of the casing, a seal 107 is provided to seal the casing around the shaft. Whilst the shaft 106 is shown extending out of only one end of the casing, it will be appreciated that the principles of the present disclosure may be extended to electric machines in which the shaft extends the full way through the casing, thus having what are commonly referred to as working and non-working ends. In such an implementation, another seal 107 would be provided to seal the casing around the two ends of the shaft.

In the present embodiment the seal 107 is a dry gas seal. Such seals feature zones between the stationary face of the casing and rotating face of the shaft into which gas is pumped. When the pressure of gas in these zones exceeds the static pressure holding the faces together, the faces separate by a thin layer of gas. Dry gas seals are supplied gas at pressure via an inlet, and have an outlet for seal gas to be vented. As the zones are small, the pressure in them tends to be greater than that in the casing 104, and thus there is little leakage of gas from the casing 104 through the seal 107 in such an implementation.

It will be apparent that the degree of pressurisation required within the casing 103 is dependent upon, with respect to any two electrodes therein, the peak operational potential difference between them, and the distance between them. Paschen's law may therefore be used to obtain, given a peak operational voltage, the maximum permitted product of pressure and distance between electrodes to prevent electrical breakdown, and therefore arcing, corona, etc An embodiment of the electric machine 101 employing a dry gas seal is shown in schematic form in FIG. 2.

In this example, the pressurisation system 102 receives input gas and pressurises the casing 104. The seal 107, which as discussed is a dry gas seal, also receives a supply of pressurised air. In this example, the seal 107 vents to atmosphere.

Figure 2:
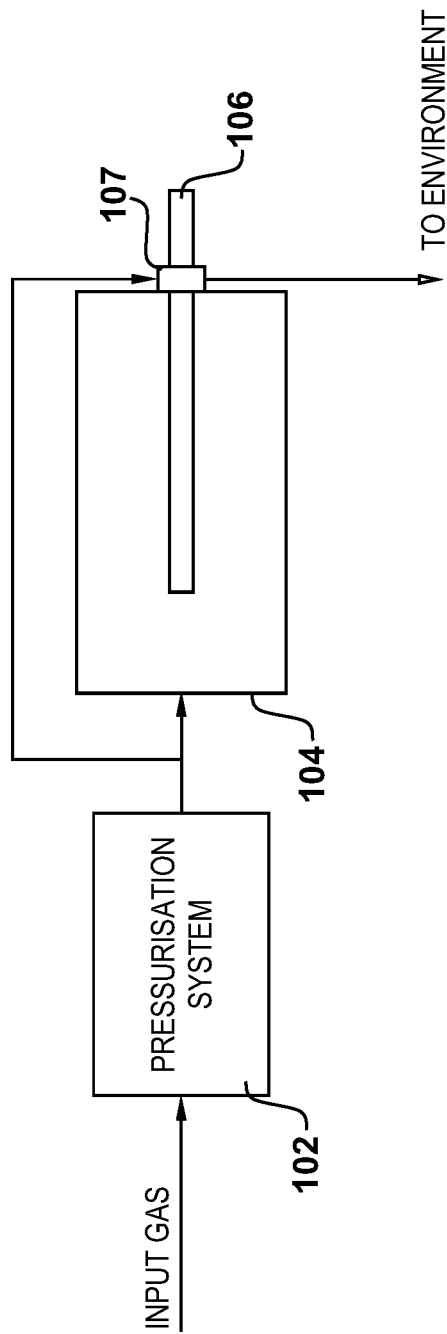
FIG. 2 shows a first embodiment of the electric machine of FIG. 1.
Figure 3:
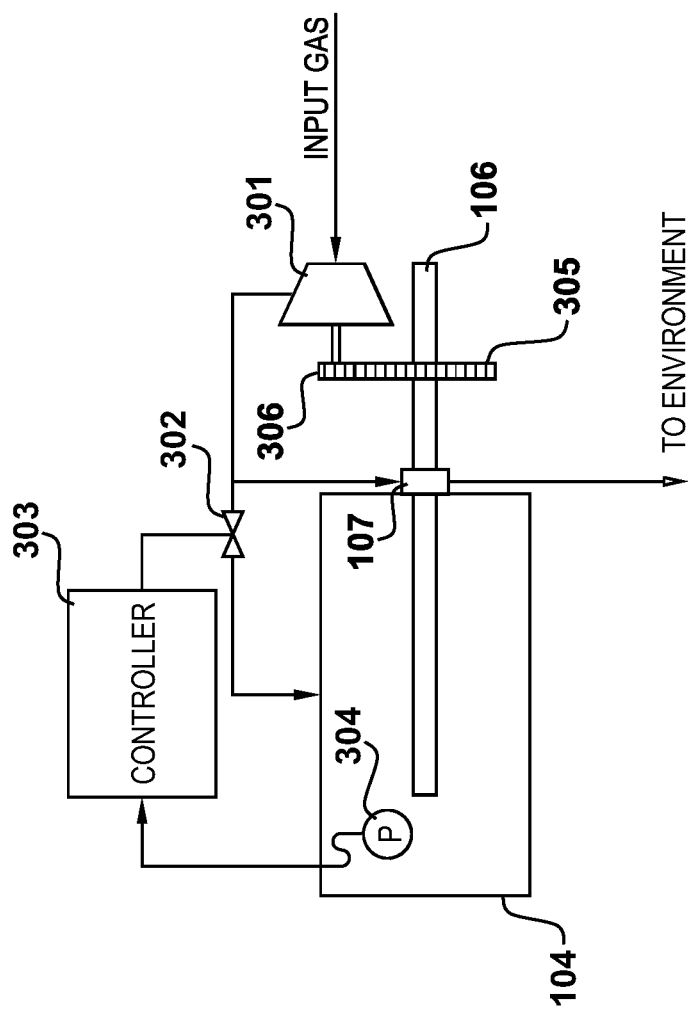
FIG. 3 shows one way of implementing the electric machine of FIG. 2.

A practical approach to implementing the electric machine of FIG. 2, is shown in FIG. 3.

In this example, the pressurisation system 102 comprises a compressor 301 driven by the shaft 106. In the illustrated embodiment, the compressor is a single-stage centrifugal compressor, but could be an axial compressor and alternatively, or in addition, may be multi-stage.

In the embodiment shown in FIG. 3, a pressure relief valve 302 is provided between the outlet of the compressor 301 and the casing 104 to allow the pressure in the casing 104 to be maintained at a level sufficient to prevent electrical breakdown.

Whilst a mechanical pressure relief valve may be used, in the present example a controller 303 and a pressure sensor 304 within the casing are provided. This may provide more accurate control, for example in terms of bandwidth. The pressure sensor 304 is configured to provide the controller 303 with a signal indicative of the pressure therein, which the controller 303 is configured to utilise to control the relief valve 302 by means of a solenoid (not shown).

In an example, the controller 303 is an analog controller configured to implement a prescribed control loop. Alternatively, the controller may be a digital controller with software-defined logic to achieve the desired control over the pressure in the casing 104. The controller in the latter case may form part of another sub-system in the wider installation the electric machine 101 forms part of.

The control loop in the present example operates to compare the current pressure within the casing 104 to a prescribed threshold, above which electrical breakdown may occur. If the current pressure is determined to be below the threshold, the relief valve 302 is closed. If the current pressure is determined to be above the threshold, the relief valve 302 is opened.

In a specific embodiment, a degree of hysteresis is included in the control loop to prevent over-actuation of the relief valve 302. In this way, the valve is only opened once the pressure in the casing 104 is above the threshold pressure, plus a lag value. As gas leaves the casing 104, the pressure will drop and approach the threshold, leading to the relief valve 302 being closed by the controller 303 to repressurise the casing 104.

In an alternative embodiment, the compressor 301 may be clutched to the shaft, with the controller 303 thereby being configured to determine, based upon the output of the pressure sensor 304, whether the pressure in the casing is above or below a threshold, which if not met could result in voltage breakdown and arcing. Following the determination, the controller 303 may either enable or disable the compressor 301 by operating the clutch.

Thus, in either embodiment, the controller 303 operates in response to the output of the pressure sensor 304 to either allow the compressor 301 to pressurise the casing 104, or prevent it from doing so.

The compressor 301 is, in the present example, geared to the shaft 106 in order to drive the compressor 301 at the requisite angular rate to pressurise the casing 104. In the present example, this is achieved by a combination of a gear 305 on the shaft 106 meshed with a pinion 306 to drive the compressor 301. It will be appreciated that the gear ratio will be in practice be dependent upon a combination of the angular rate required for the compressor 301, which will typically be in the 50000 to 70000 rpm range, and the operational rate of the electric machine 101. In a specific embodiment, the gear system used to connect the vacuum pump to the shaft is a magnetic gear.

In a further variation, the compressor 301 may be geared to the shaft using a variable transmission, possibly a variable magnetic gear, such that the compressor's speed and therefore pressure ratio may be varied by the controller 303 to maintain the pressure in the casing 104 at a fixed value or within an acceptable defined range.

Gearing may be omitted, of course, if the electric machine 101 is to operate at same angular rate as required by the compressor 301.

Figure 4:
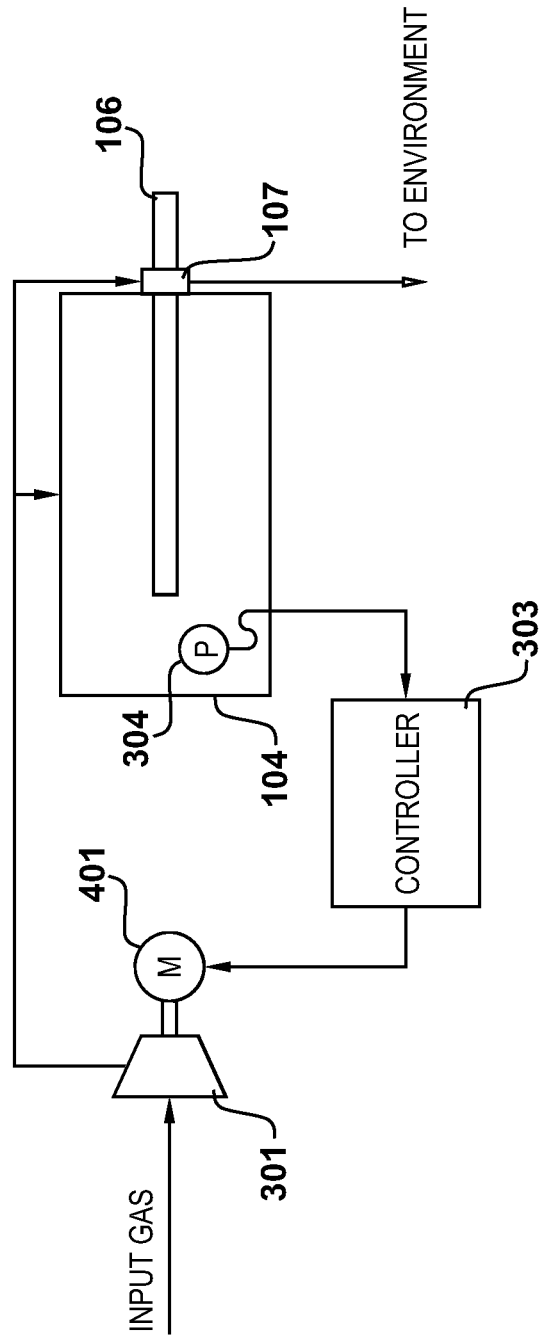
FIG. 4 shows another way of implementing the electric machine of FIG. 2.

Another approach to implementing the electric machine of FIG. 2 is illustrated in FIG. 4.

In this example, the pressurisation system 102 comprises compressor 301, but in an electrically-driven configuration in which it is driven by a motor 401.

The motor 401 operates under the control of controller 303 which, in a similar way as described previously with reference to FIG. 3, may either enable or disable it in response to the output of pressure sensor 304 in the casing 104. Alternatively, the controller 303 may vary the speed of the motor 401 so as to maintain the pressure in the casing 104 at a fixed value or within an acceptable range.

The motor 401 in this example operates at a much lower voltage than the electromechanical components in the casing 104. In this way, it is able to operate in low pressure environments such as at aircraft cruise altitude without experiencing electrical breakdown, whereas breakdown could occur between the components in the casing 104 without pressurisation due to the high voltages therein. Of course, it will be understood that the motor 401 could, in an alternative embodiment, be itself subjected to pressurisation should electrical breakdown be possible due to its specification and operating environment.

One benefit of using the arrangement shown in FIG. 4 is that, prior to starting the electric machine 101, the casing 104 may be pressurised by the compressor 301 driven by the motor 401. This can be of particular advantage should the electric machine 101 form part of an on-demand system in an aircraft in which it would not be running constantly. Further, it may be of advantage should the electric machine 101 form part of a wider system that is only started and used in low-pressure environments, rather than being started at, say, sea level and transitioning to a higher altitude.

Figure 5:
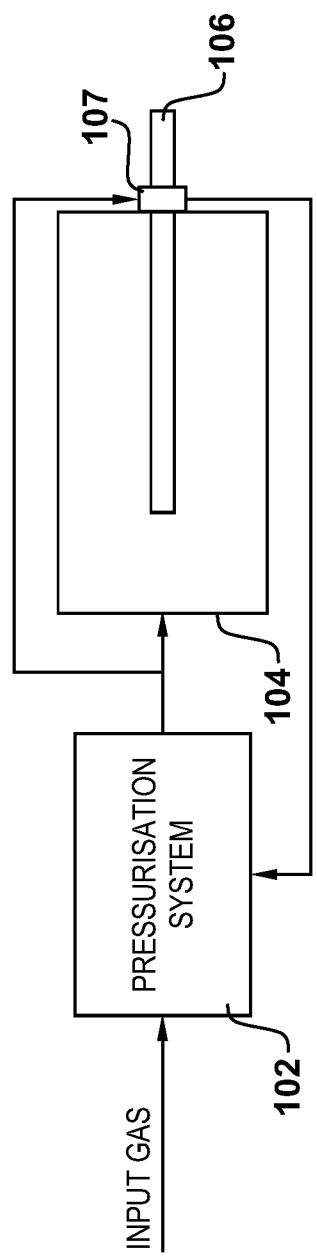
FIG. 5 shows a second embodiment of the electric machine of FIG. 1.

A further embodiment of the electric machine 101 employing a dry gas seal is shown in schematic form in FIG. 5.

In this example, the pressurisation system 102 receives input gas and pressurises the casing 104. The seal 107, which as discussed is a dry gas seal in the present example, also receives a supply of pressurised air.

In this example, the seal 107 does not vent to atmosphere and instead directs the pressurised air from the seal 107 back to the pressurisation system 102 to enable a degree of energy recovery. It should be noted that the gas leaving the casing 104 via the seal 107 will be warmer than at the inlet to the casing 104, as it will have been heated by the electromechanical components therein.

Figure 6:
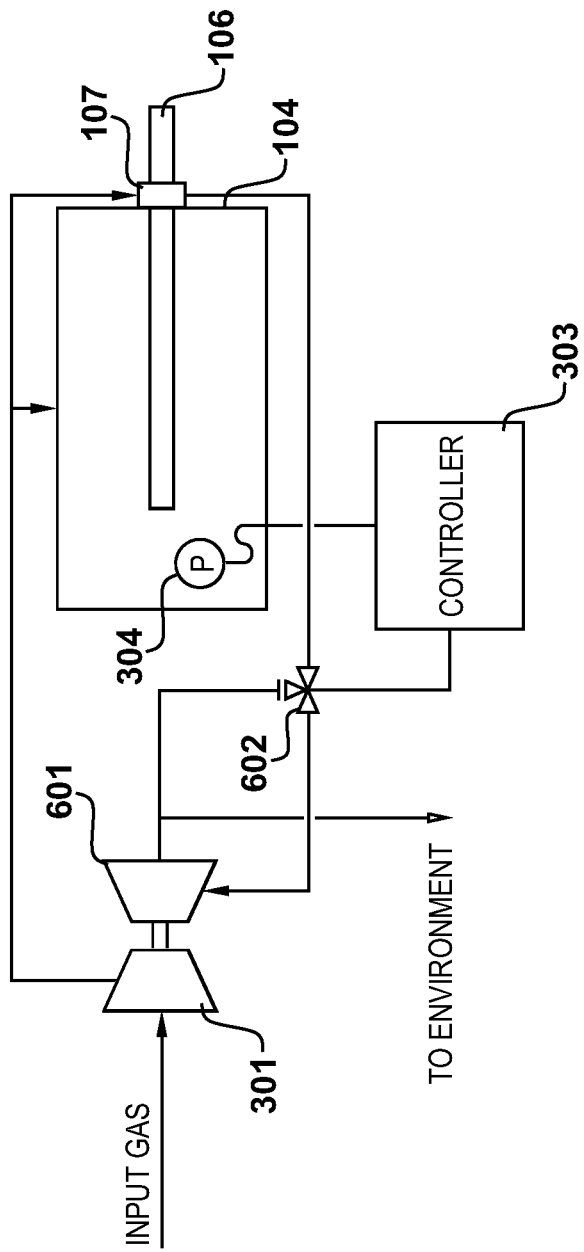
FIG. 6 shows a way of implementing the electric machine of FIG. 5.

An implementation of the electric machine of FIG. 5, is shown in FIG. 6.

Those skilled in the art will appreciate the similarities between the arrangement shown in the Figure and a turbocharger. In this regard therefore, the pressurisation system 102 comprises compressor 301, but now driven by a turbine 601 via a suitable interconnecting shaft. As described previously, the compressor 301 may be of various types, and indeed in this example the turbine 601 as well may be centrifugal or axial, single- or multi-stage or any combination thereof.

As in the previously-described embodiments, the compressor 301 is configured to pressurise gas which is then delivered to the casing 104 and the inlet of the seal 107. An inlet of the turbine 601 is connected with the outlet of the seal 107. Gas from the outlet of the seal 107 therefore drives the turbine 601, which in turn drives the compressor 301. As there is no further requirement for the gas exiting the seal 107, the turbine is at liberty to extract as much energy as possible from the air.

It will be appreciated by those skilled in the art that the use of a turbine to drive the compressor is more efficient than simply dumping the gas from the outlet of the seal 107 into the inlet of the compressor 301. This is because the gas from the seal 107 has been heated and so pressurising it requires more energy than would be required for cold input gas.

In order to maintain the pressure in the casing, a relief valve 602 is provided to allow excess gas from the seal 107 to be vented to atmosphere. The relief valve 602 operates under the control of controller 303, which in this embodiment is configured to respond to a reading of the pressure in the casing 104 from pressure sensor 304 therein, as in the previously-described embodiments. The controller 303 is configured to open the relief valve 602 when the pressure in the casing 104 rises above a threshold, and to close it when the pressure drops below the threshold. In this way, the turbine is slowed down or speeded up, disabling or enabling the compressor.

Should the amount of energy in the gas vented from the seal 107 be insufficient to drive the turbine 601, a turbo-compounding approach may be adopted by using, for example, an electric motor to supplement the turbine. In a further alternative implementation, the relief valve 603 may be omitted with an electric machine being used in a motor mode of operation to supplement the turbine when the gas supply from the seal 107 is not sufficient, and in a generator mode of operation to harvest electrical energy to a battery when the gas supply from the seal exceeds the amount required to pressurise the casing 104.

Again, it will be appreciated that the associated electronic and electrical equipment outside of the casing 104 will not be operating at the voltage levels encountered within which are much more likely to result in voltage breakdown. As previously described, however, it will be understood that said equipment could, in an alternative embodiment, be itself subjected to pressurisation should electrical breakdown be possible due to its specification and operating environment.

It should also be noted that the pressurisation of the casing 104 may also assist significantly in improving the cooling of the electromechanical components therein. This is because as air's pressure decreases, the less effective it is at removing heat from surrounding components. By raising the pressure within the casing, there is more gas therein and hence higher total heat capacity. Thus, current derating may not need to be performed at low pressures.

Lastly, it will be appreciated that the electric machine 101 of the present disclosure and the principles it embodies may be used in any gaseous environment which, when combined with the specification of the electromechanical components within the casing 104, is liable to cause electrical breakdown therein. This may be anticipated by application of Paschen's law. Thus, in terms of the parameters that may cause this, the possibility of electrical breakdown occurring may be ascribed to one or more of the external gas pressure within the environment 105, the peak voltages within the casing 104, and/or the minimum distance between electrodes within the casing 104. Thus, for example, the electric machine 101 may indeed be used in applications at, say, standard temperature and pressure, if the peak voltage and minimum distance are such that electrical breakdown may still occur.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electric machine for use in an aircraft, comprising:
   a casing containing electromechanical components;
   a shaft which extends outside of the casing;
   a dry gas seal to seal the casing around the shaft; and
   a pressurisation system configured to pressurise the casing above an external pressure to prevent electrical breakdown within gas in the casing, wherein:
   an inlet of the dry gas seal is connected with the pressurisation system to receive pressurised gas from the pressurisation system;
   the pressurisation system comprises a compressor configured to increase a pressure of the pressurised gas that is supplied to the interior of the casing via the inlet of the dry gas seal;
   the compressor is a driven by a turbine, and
   an inlet of the turbine is connected with an outlet of the dry gas seal to receive the pressurised gas therefrom to drive the turbine, wherein the pressurised gas is removed from an interior of the casing only via the outlet of the dry gas seal.

2. The electric machine of claim 1, in which the compressor is driven electrically.

3. The electric machine of claim 1, which the pressurisation system comprises:
   a pressure sensor configured to output an indication of the gas pressure within the casing; and
   a controller configured control the pressurisation of the casing in response to the output of the pressure sensor.

4. The electric machine of claim 3, in which the controller is configured to:
   determine that the pressure within the casing has dropped below a threshold, and allow the compressor to pressurise the casing;
   determine that the pressure within the casing has risen above the threshold, and prevent the compressor from pressurising the casing.

5. The electric machine of claim 3, in which the controller is configured to vary the speed of the compressor to maintain the pressure within the casing at a constant pressure above the external gas pressure.

6. An aircraft including an electric machine, said electric machine comprising:
   a casing containing electromechanical components;
   a shaft which extends outside of the casing;
   a dry gas seal to seal the casing around the shaft; and
   a pressurisation system configured to pressurise the casing above an external pressure to prevent electrical breakdown within gas in the casing, wherein:
   an inlet of the dry gas seal is connected with the pressurisation system to receive pressurised gas from the pressurisation system;
   the pressurisation system comprises a compressor configured to increase a pressure of the pressurised gas that is supplied to the interior of the casing via the inlet of the dry gas seal;
   the compressor is a driven by a turbine, and
   an inlet of the turbine is connected with an outlet of the dry gas seal to receive pressurised gas therefrom to drive the turbine,
   wherein the pressurised gas is removed from an interior of the casing only via the outlet of the dry gas seal.

7. The aircraft of claim 6, in which the pressurisation system is configured to receive a supply of gas from a bleed air system of an engine of the aircraft.

8. The aircraft of claim 6, in which the pressurisation system is configured to receive a supply of gas from a cabin air exhaust of the aircraft.

9. The aircraft of claim 6, in which the electric machine is located within an engine of the aircraft.

10. The electric machine of claim 6, in which the compressor is driven electrically.

11. The electric machine of claim 6, in which the pressurisation system comprises:
    a pressure sensor configured to output an indication of the gas pressure within the casing; and
    a controller configured control the pressurisation of the casing in response to the output of the pressure sensor.

* * * * *